United States Patent [19]

Verbeke et al.

[11] Patent Number: 5,340,995
[45] Date of Patent: Aug. 23, 1994

[54] SCANNER FOR THE PSL RADIOGRAPHIC CASSETTE

[75] Inventors: Gentil Verbeke; Gerard Boeve, both of Edegem, Belgium

[73] Assignee: AGFA-Gevaert N. V., Mortsel, Belgium

[21] Appl. No.: 38,810

[22] Filed: Mar. 25, 1993

[30] Foreign Application Priority Data

Apr. 21, 1992 [EP] European Pat. Off. ......... 92201110.1

[51] Int. Cl.$^5$ ............................................. G01N 23/04
[52] U.S. Cl. ................... 250/581; 250/484.4
[58] Field of Search .............. 250/484.4, 581, 584, 250/585, 586, 589

[56] References Cited

U.S. PATENT DOCUMENTS 5,090,567  2/1992  Boutet .
5,180,915  1/1993  Ohgoda ................... 250/585

Primary Examiner—Carolyn E. Fields
Attorney, Agent, or Firm—William J. Daniel

[57] ABSTRACT

Scanning apparatus for scanning a cassette of the type used form photo-stimulable phosphor luminescence (PSL) radiography that includes a rigid base plate carrying a PSL layer thereon and a cover adapted to be releasably secured to the base plate in overlying relation to the PSL layer, in which a cassette is removed one-by-one from an input stack of a number of cassettes arranged with the plates thereof in generally vertical orientation and transported to a separating station for removal of the cover, to a scanning station for scanning of a PSL image thereon, to an erasing station for erasing the scanned image, and to a re-assembly station for re-assembly of the cover and base plate, all while the base plate is maintained in generally vertical orientation and preferably is displaced only within its own plane. The re-assembled cassettes are stacked vertically in an output stack for removal from the apparatus.

5 Claims, 5 Drawing Sheets

SCANNER FOR THE PSL RADIOGRAPHIC CASSETTE

BACKGROUND OF THE INVENTION

1. Field of the Invention

The present invention relates to scanning apparatus for scanning a cassette of the type used in photo-stimulable luminescence ("PSL") radiography and comprising a PSL plate and a cap therefor.

2. Description of the Prior Art

In conventional radiography ("X-ray photography"), a film plate is made by forming one or more silver halide emulsion layers on a flexible film base which is supported within a light-tight cassette. The interior of the cassette is coated with one or more X-ray sensitive luminescent layers. The cassette containing an unexposed X-ray film plate is loaded into an X-ray machine, and after exposure the cassette and exposed X-ray film plate are removed for development and fixing of the latent image produced. This is usually done automatically by feeding the cassette into a light-tight apparatus in which the cassette is opened, and the exposed film plate is extracted and passed through a series of troughs containing the various chemical processing solutions required. The processed plate may also be dried in the apparatus. Meanwhile, a new, unexposed film plate has been loaded into the cassette which is then re-closed, and the reloaded cassette and developed film plate are delivered to respective exit slots of the processing apparatus.

In the PSL system, a PSL X-ray plate has applied thereto a layer of a photostimulable luminescent material which comprises a stimulable phosphor, for example a europium-activated barium fluorohalide, and a binder. The phosphor has the characteristic that it can be energised to an excited state by X-rays, and can then be stimulated by visible or infra-red light to return to the ground state with the emission of visible light (of a different wavelength from the stimulating light). The excited state has a half-life of at least several hours or days in the absence of stimulating light. A PSL plate is potentially re-usable many times. The technique is described in an article by Sonoda et al. in Radiology, Volume 148 (September 1983), at pages 833 to 838, and it offers the potential advantages of better image resolution at lower X-ray dosages for the patient.

The stimulable phosphor is deposited as a layer on a flexible base which also requires enclosure in a light-tight cassette.

Current practice in PSL radiography is to pass the exposed PSL plate in its cassette to an automatic processing machine in which the PSL plate is removed from the cassette, scanned, exposed overall to light to return the PSL material to its ground state and then reloaded into the same cassette for reuse. For scanning, the exposed PSL plate is transported past a laser, typically a helium-neon laser emitting at a wavelength of 633 nm, which scans line-wise across the plate in front of a light-guide comprising a bundle of optical fibres whose input ends are arranged in a line across the path of the plate close to the laser scanning line for the reception of light emitted, typically at wavelengths close to 400 nm, when the PSL material is stimulated by the laser. The light-guide is arranged to pass the emitted light to a photo-multiplier tube or other receptor. The result is a storable electronic raster image. The electronic image may be subjected to any desired computer image-enhancement techniques and it may be displayed on a video display unit, fed to a laser printer for the production of a plain paper copy, or used to control a laser arranged to expose correspondingly a photographic film plate to produce an X-ray plate of conventional appearance.

It will be appreciated that the organisation and operation of a PSL system are analogous to those of a photographic emulsion system. In a photographic emulsion system, the exposed film plate is transferred to a processing apparatus in which the latent image on the film plate is chemically developed and the developed image is scanned. In a PSL system, the film plate of the photographic emulsion system is replaced by the PSL plate. This plate is exposed in the X-ray machine, and is then transferred to a scanning apparatus in which the latent image is scanned by a scanning beam which "develops" the image in the process of scanning.

The components of PSL systems have therefore hitherto been designed to match those of photographic emulsion systems as far as feasible, to take advantage of the design and development investment and experience which has been accumulated with photographic emulsion systems. In particular, the plates of PSL material used in PSL systems and their handling have generally been designed to match those of photographic emulsion systems. In such PSL systems, the PSL material is thus in the form of a coating on a flexible film which is removable from a cassette, and little attention has been paid to the design of PSL scanning apparatus other than to replace the chemical processing stage with a physico-optical stage and to arrange for the cassette to be re-loaded with the same PSL plate after erasure, as opposed to reloading with a new, unexposed photographic plate.

Cassettes in a known PSL system are conventional X-ray cassettes, comprising a base and a lid hinged thereto, both parts having at the inside a soft lining for protection of the enclosed PSL sheet. Systems using suchlike cassettes are voluminous because opening the lid of a cassette must occur over a certain minimum angle to get sufficient access to the interior for a suction cup to catch the film and remove it from the cassette. In addition, manipulation of the locks of the cassette, of the hinging cap, and delicate gripping and transport of the exposed PSL sheet require a considerable amount of precise, mechanical gripping means and co-operating servo-motors making control of the system complicate and requiring additional space. A system of the kind described is disclosed in EP-A-0 309 874.

An example of a photographic cassette comprising a separate cap is disclosed in EP-A 0 347 647. This cassette has the disadvantage that the support for the screen, i.e. the cap, is flexible whereby its manipulation becomes more delicate.

DESCRIPTION OF THE INVENTION

Object of the Invention

This arrangement has various disadvantages, as will be adverted to later in this specification, and it is an object of this invention to provide a new form of scanning apparatus for use in scanning a PSL radiographic cassette, which has a compact construction and which allows a gentle treatment of an exposed PSL plate.

SUMMARY OF THE INVENTION

According to the present invention, there is provided scanning apparatus for scanning a cassette of the type used in photo-stimulable luminescence ("PSL") radiography, which cassette comprises a flat substantially rigid base plate which is releasably securable to the base plate so as light-tightly to cover a layer of PSL material applied to a face of the base plate, characterised in that such apparatus comprises a receiving station for the receipt of a cassette into the apparatus, transport means for conveying the cassette to a separating station which includes means for separating the base plate and its cap from each other, means for transporting the base plate along a path leading through a scanning station where the plate may be scanned and, via an erasing station, to an assembly station where the plate and its cap are re-assembled, the apparatus being arranged in such a way that the cap and the base plate remain in substantially parallel relationship during their separation.

A PSL cassette scanning apparatus according to the invention offers a number of very important advantages over the use of a conventional PSL cassette scanning apparatus. Conventional PSL scanning apparatus takes account of the fact that the PSL cassette contains a separate flexible PSL plate, and known scanning apparatus guides that plate around a curved path. As a result, the flexible plate of a PSL cassette will inevitably in use undergo flexure. As a result the layer of PSL material will be stressed. This will inevitably lead to breakdown of the PSL material. While it is possible to prolong the life of the PSL material by a suitable choice of binder for the phosphor and by increasing the proportion of binder in the PSL material, if the proportion of binder is increased, the proportion of phosphor will be reduced so resolution will also be reduced. It might be possible to make some gain in resolution by making the PSL material thicker, but it will be appreciated that increasing the thickness of a PSL layer will lead to an increase in scattering which is a further cause of loss of resolution. These problems need not arise in a PSL cassette used in scanning apparatus according to the invention. Because the PSL material is maintained in flat condition all the while it is in the scanning apparatus, it will not be stressed in that way. The PSL plate will therefore have a longer useful service life. Also, and at least as importantly, because the layer of PSL material is not stressed in that way during its transport through the scanning apparatus, it can be made thinner, and with a higher proportion of phosphor to binder, without any substantial deleterious effect on its service life, thus leading to a significant potential increase in resolution.

A PSL cassette which is particularly suited for use with the scanning apparatus according to the present invention, is described in copending application No. EP 92 201 109.3 in our name, entitled "Cassette for PSL Radiography" and filed on Apr. 4, 1992. A corresponding application has been filed in the U.S. on Mar. 30, 1993, under Ser. No. 08/039,993.

The use of such a PSL cassette in scanning apparatus according to the invention offers further advantages. Because a conventional PSL plate is flexible, it may need to be held flat after removal from its cassette for transport through the scanner and this may imply that both faces of such a plate require to be contacted, for example by transport rollers, and this or any other contact with the coated face of the plate will involve a risk that the PSL layer will become scratched, albeit perhaps only along margins of the plate. This disadvantage too is alleviated by the adoption of this preferred feature of the invention. Because the PSL plate of this new cassette is flat and rigid, it can readily be transported through a scanner without any contact between parts of the scanner transport system and the PSL layer. Such transport could for example be effected by rollers bearing on the edge faces of the plate or by brackets mounted on conveyor belts. A further advantage of using a flat and rigid PSL plate is that the light-guide of the scanner apparatus can be located closer to the path of the plate while still giving a reliable clearance for the passage of the plate without any contact between the plate and the light-guide. A small, but nevertheless reliable, clearance between the plate and the light-guide promotes the efficiency and resolution with which light emitted by the PSL material is collected.

In some embodiments of the invention, the scanning apparatus is designed to accommodate a single cassette at a time. This has the advantage of simplifying the construction of the apparatus, but it involves the inconvenience of requiring substantially continuous supervision by an operator who must stand by to remove each cassette before the next successive cassette is introduced. Such apparatus is, however, eminently suitable for installation where a low throughput of cassettes is envisaged. In such embodiments it is preferred that said separating station and said assembly station are one and the same. This permits a very simple transport system within the scanning apparatus. For example the cap may be separated from the plate in the separating station and held there while the plate is transported through the scanning and erasing stations and then reverses its path back to the separating station, now the assembly station, where the plate is re-assembled to its cap. This also promotes compactness of the apparatus, since there is no need to provide space for a path for the cap to the assembly station, thus allowing a saving in weight and materials used for a frame of the apparatus and any cladding for that frame. Also, such an apparatus does not require a large floor area for installation.

It is preferred, however, that the apparatus be capable of being loaded with a batch of cassettes which can be processed without continuous supervision, and to that end, said receiving station advantageously comprises a shelf for holding an input stack of cassettes and means for successively taking members of such stack into the apparatus, and said apparatus further comprises an output shelf for holding a stack of re-assembled cassettes ejected from the apparatus. This greatly eases use of the scanning apparatus since an operator may simply load a batch of cassettes onto the input shelf and then return to the apparatus when the plates in those cassettes have been processed and those cassettes have eventually been ejected to form a stack on the output shelf.

Compactness of such apparatus and consequent savings in weight and materials are promoted when, as is preferred, such apparatus further comprises means for transporting said cap to said assembly station along a path by-passing said scanning and erasing stations. This simplifies construction of the transport system and promotes compactness because the cap is not transported past the scanning station with the optical equipment between it and the plate which would require a substantial separation, for example as much as 60 cm or even more, between the plate and its cap. Indeed such an apparatus may readily be accommodated within a cabinet having a footprint less than 1 meter by 2 meters, with access required to a shorter side for the insertion and removal of cassettes. This is in marked contrast to typical known PSL cassette scanning apparatus which has a footprint of about 1.5 to 2 meters by 3 to 4 meters. Furthermore, because a scanning apparatus is so much smaller (and also lighter in weight) it can readily be mounted on wheels. Thus, it can be moved easily for access by a service engineer, and can ordinarily be located for example in a corner of a room with only a small clearance around it for ventilation purposes. It could also be moved easily from room to room, and it may be manufactured as a unit and transported as a whole to the installation site. The very much larger known apparatus, on the other hand, is difficult and inconvenient to move and it must accordingly be installed in a room with sufficient clearance around it for access by the service engineer. Furthermore, such known apparatus usually requires to be manufactured in modules which are assembled at the installation site.

Preferably, said transport means is arranged to transport said plate substantially in its own plane along said path from said separating station to said assembly station.

BRIEF DESCRIPTION OF THE DRAWINGS

Preferred embodiments of this invention will now be described with reference to the accompanying diagrammatic drawings in which.

DETAILED DESCRIPTION OF PREFERRED EMBODIMENTS OF THE INVENTION

Figure 1A:
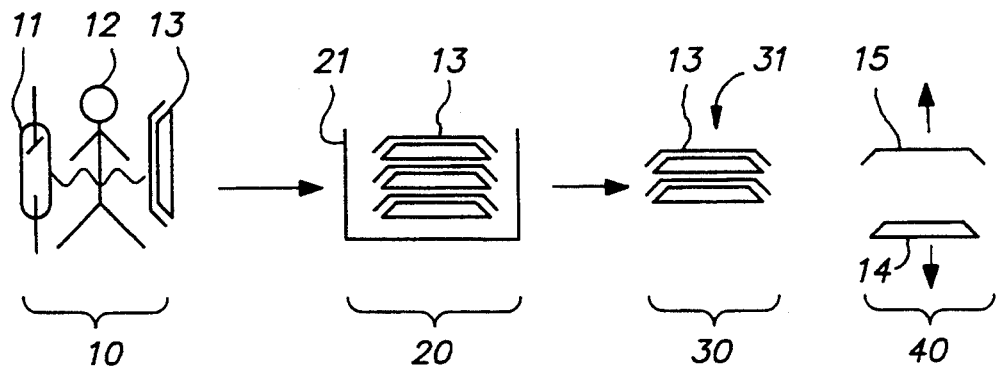
FIGS. 1a and 1b are a block diagram illustrating the organisation of a PSL radiographic system incorporating the invention.
Figure 1B:
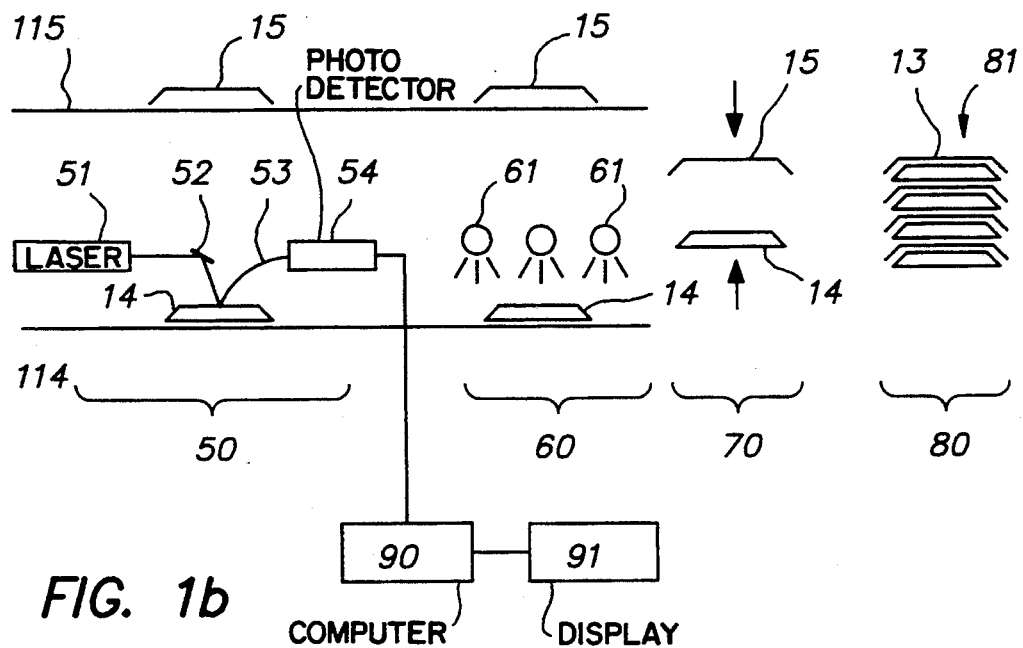

Referring to FIGS. 1a and 1b, the PSL system comprises an X-ray machine 10, a scanning apparatus which includes a cassette receiving station 30, a separating station 40, a scanning station 50, an erasing station 60, an assembly station 70 and an output station 80, together with a computer 90 having a display unit 91. The X-ray machine 10 comprises an X-ray tube 11 in front of which a patient 12 is positioned, with a PSL cassette 13 placed to receive the X-rays which have passed through the patient. Each cassette 13 comprises a base plate 14, on which is deposited a layer of PSL material, and a cap 15.

Transport of thus exposed cassettes from the X-ray machine room to a scanning apparatus is represented at 20 by a batch of cassettes 13 loaded onto a trolley 21. On arrival at the scanning apparatus, the cassettes 13 are placed in the receiving station 30 in a stack 31. Successive cassettes 13 are transported from the receiving station 30 to a separating station 40 where the cap 15 is separated from the base plate 14.

The base plate 14 then follows a path 114 through the scanning station 50 and the erasing station 60. This path 114 is such that the base plate 14 remains flat throughout, and indeed, it is transported in its own plane. In the scanning station 50, a layer of PSL material (not shown in FIGS. 1, but shown at 16 in FIGS. 3 and 4) on top of the base plate 14 is scanned by a beam from a laser 51 using a scanner mirror 52. This beam stimulates any excited PSL material to return to the ground state with the emission of light. This emitted light is picked up by a light guide 53 which consists of a bundle of optical fibres formed into a flat plate above the scan track of the beam from scanner mirror 52 at one end and a circular or otherwise compact bundle at the other end. That compact bundle is matched to a photo-detector 54 consisting of a photo-multiplier tube. The photo-detector 54 feeds the computer 90.

The erasing station 60 comprises a set of fluorescent tubes 61 past which the base plate 14 is moved. This subjects the PSL material on the top surface of the base plate to intense light, so discharging any remaining energisation of the PSL material and ensuring that it is all returned to its ground state. The base plate 14 is then transported to the assembly station 70.

The cap 15 meanwhile follows a separate path 115 from the separating station 40 to the assembly station 70, this path 115 by-passing the scanning 50 and erasing 60 stations.

The cap 15 and base plate 14 are re-united in the assembly station 70 and are ejected together as a cassette 13 onto a stack 81 in the output station 80 of the apparatus.

Figure 2:
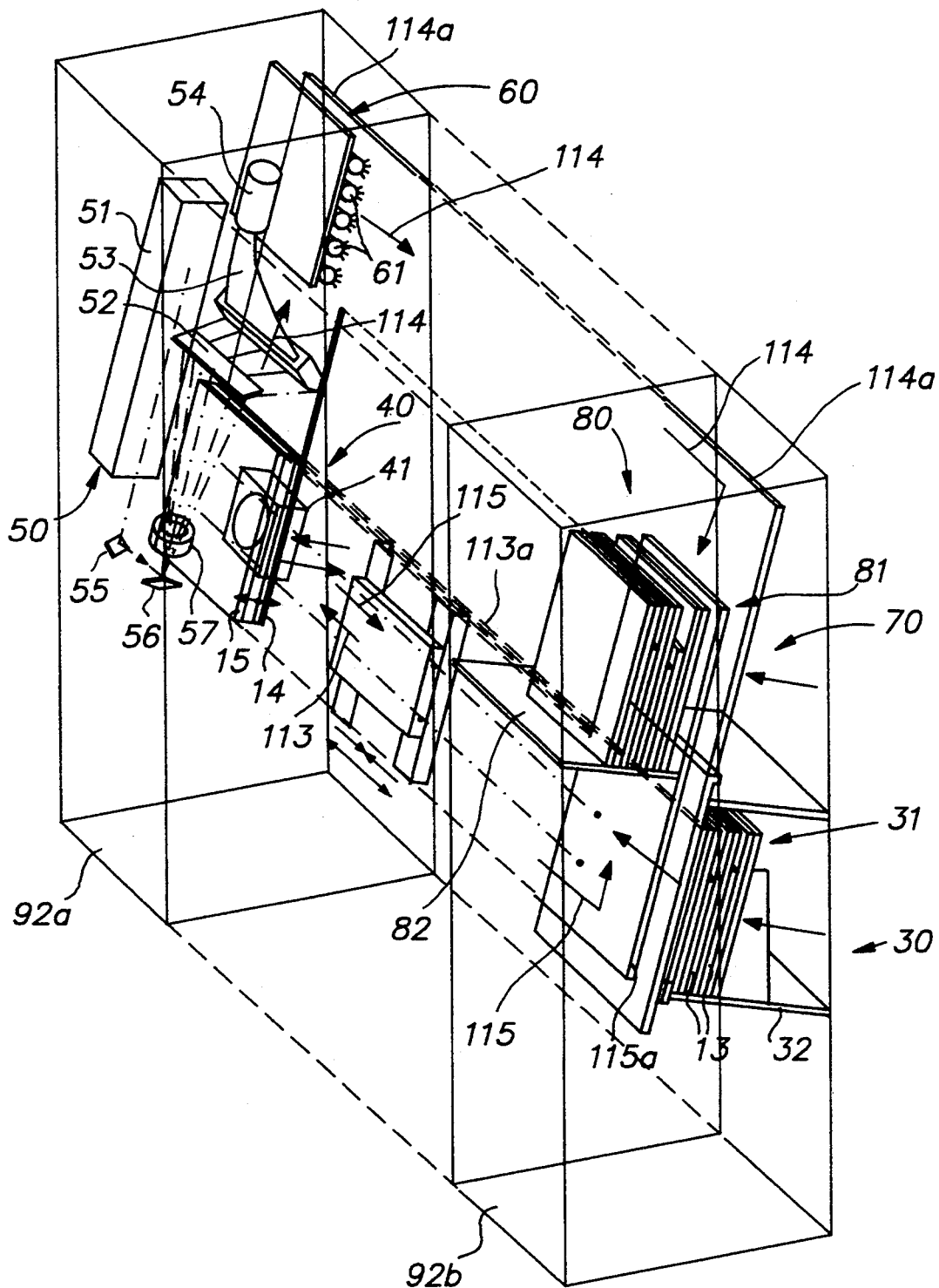
FIGS. 2 and 3 are schematic diagrams illustrating a first embodiment of scanning apparatus in accordance with this invention.
Figure 3:
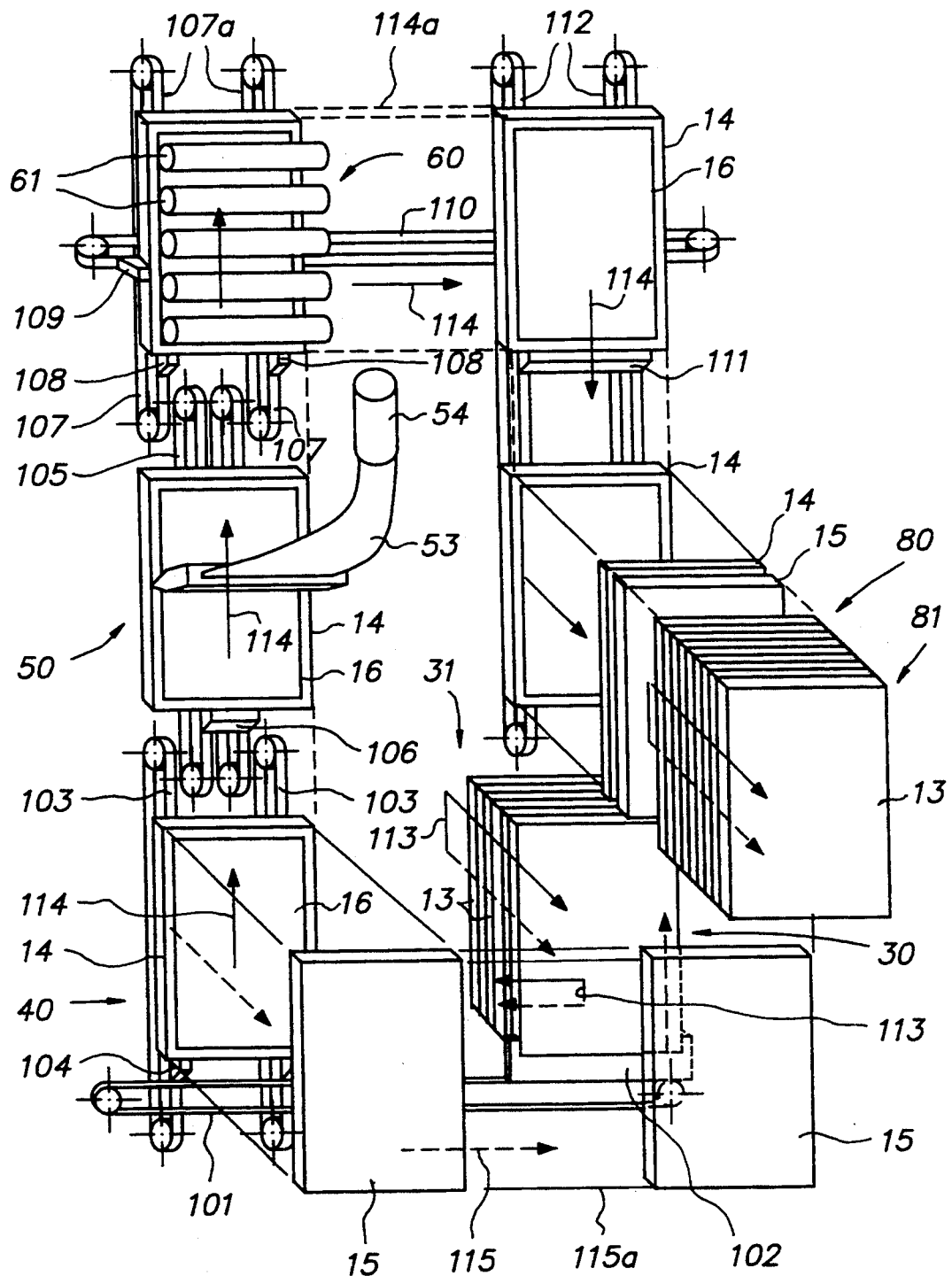

In FIGS. 2 and 3, cassettes 13 are loaded into a stack 31 on a shelf 32 (FIG. 2) at the receiving station 30. Successive cassettes 13 are removed from the front of the stack 31 and are then taken along a path 113 to a separating station 40 where the base plate 14 and cap 15 of the cassette 13 are separated. As can be seen in FIG. 2, the cassettes in the stack are arranged so that the planes of their flat sides are parallel and extend in a generally vertical direction. It is convenient and preferred, however, for the apparatus to be arranged as shown in FIG. 2 so that the cassette parts and the paths they follow are inclined slightly from the vertical, as again can be seen from FIG. 2. In this way, the cassettes may rest on one or more conveyors, suitably belt conveyors, under gravity during their transport through the scanning apparatus. One arrangement of the various conveyors which may be used is shown in FIG. 3. The cassette base plate 14 leaves the separating station 40 in an upward direction along path 114 and passes through the scanning station 50, whereafter the base plate 14 continues its upward movement to or through an erasing station 60 before moving horizontally back to a position from which it can then move downwardly to an assembly station 70. Meanwhile, the cassette cap 15 is transported from the separating station along a path 115 which starts by being parallel to the initial common path 113 of the cassette parts. The cassette cap 15 is transported back in front of the receiving station 30 and is then moved upwardly to the assembly station 70 in which it is positioned in front of the just processed base plate 14. The base plate 14 is moved forwardly to engage the cap 15 and the thus re-assembled cassette 13 is ejected from the apparatus onto the rear of a stack 81 of cassettes on an output shelf 82 at an output station 80. The arrangement is such that throughout their transport, except at the separating station 40 and at the assembly station 70 and during ejection, each part 14, 15 of the cassette 13 is moved substantially in its own plane.

Referring now more particularly to FIG. 2, it is to be noted that a cabinet for the apparatus has been exploded into two portions 92a and 92b purely for clarity in the drawing. In practice, those two portions of the cabinet would be contiguous, indeed unitary, and the horizontal portions of the paths 113, 114, and 115 followed respectively by the cassette 13, the base plate 14 and the cap 15 would not be as long as is shown in the drawing. Also, it may be noted that reference numerals 113, 114, and 115 for those paths are applied to arrows representing the directions of those paths. Indications of the outlines of those respective paths are allotted reference numerals 113a, 114a, and 115a.

In the separating station 40, there is shown a holder 41 for the base plate 14 for holding that plate during its separation from its cap 15. An embodiment of such holder 41 will be described in greater detail with reference to FIGS. 5a to 5c.

In the scanning station 50, laser 51 is arranged substantially parallel with the upward reach of the base plate path 114 and the beam emitted by that laser is deflected by a mirror 55 onto a vibrating (or rotating, e.g. multi-faceted rotating) mirror 56 which passes a scanning beam through a focusing lens 57 and thence to the scanner mirror 52 which directs the beam onto the PSL layer of the base plate 14 for stimulating emission of luminescence which is collected by the light guide 53. The focusing lens 57 is suitably aspherical and so designed that the point of impingement of the laser beam on the PSL layer moves at a constant velocity during scanning, and also so that that beam remains focused on that layer despite differences in the length of the light path during such scanning.

With more particular reference now to FIG. 3, the arrow indicating the path 114 for the base plate 14 has a solid line, the arrow indicating the path 115 for the cap 15 has a broken line, and the path of the assembled cassette 13 is indicated by paired broken line and solid line arrows 113. The front cassette 13 of the input stack 31 is taken up by a bracket 102 mounted on a conveyor belt 101, and that cassette is conveyed horizontally in inclined position (cf. FIG. 2) to the separating station 40 where the cap 15 is separated from the base plate 14. After separation, the base plate 14 rests in the same inclined orientation against a pair of conveyor belts 103 supported by brackets 104 carried by those conveyor belts.

The base plate is conveyed upwardly along path 114 by the conveyors 103 and is transferred to a further pair of conveyors 105 on which the base plate 14 rests supported by a bracket 106 carried by those conveyors. The conveyors 105 transport the base plate 14 through the scanning station 50. If desired, the various parts 51 to 57 (FIG. 2) in the scanning station 50 and the scanning conveyors 105 may be mounted on a separate subfree (not shown) which is mounted to a main frame (also not shown) of the apparatus in such a way as to minimise the transfer of vibrations to the base plate 14 during the actual scanning period.

After scanning of its PSL layer 16, the base plate 14 is picked up by a third upwardly running pair of conveyors 107 on which it rests on brackets 108, and a fourth pair 107a of upwardly running conveyors which are arranged as an extension of conveyors 107. While supported by conveyors 107, 107a, the PSL layer 16 of the base plate 14 is exposed to fluorescent tubes 61 in the erasing station 60 in order to return the PSL material to its ground state. After a sufficient time to effect such erasure, the base plate is picked up by a bracket 109 mounted on a horizontally running conveyor 110 which runs between the third and fourth upwardly running conveyors 106, 108. The erased PSL base plate 14 is thus transported along a horizontal section of its path 114 (also indicated here in outline at 114a) along a shelf (not shown) to a bracket 111 mounted on a pair of downwardly running conveyors 112. The plate 14 is transported down by the conveyors 112 to the assembly station 70 where it in brought forward and re-united with its cap 15 which has meanwhile been transported along path 115, 115a from the separating station 40. The re-assembled cassette 13 is then ejected onto the output stack 81.

Figure 4:
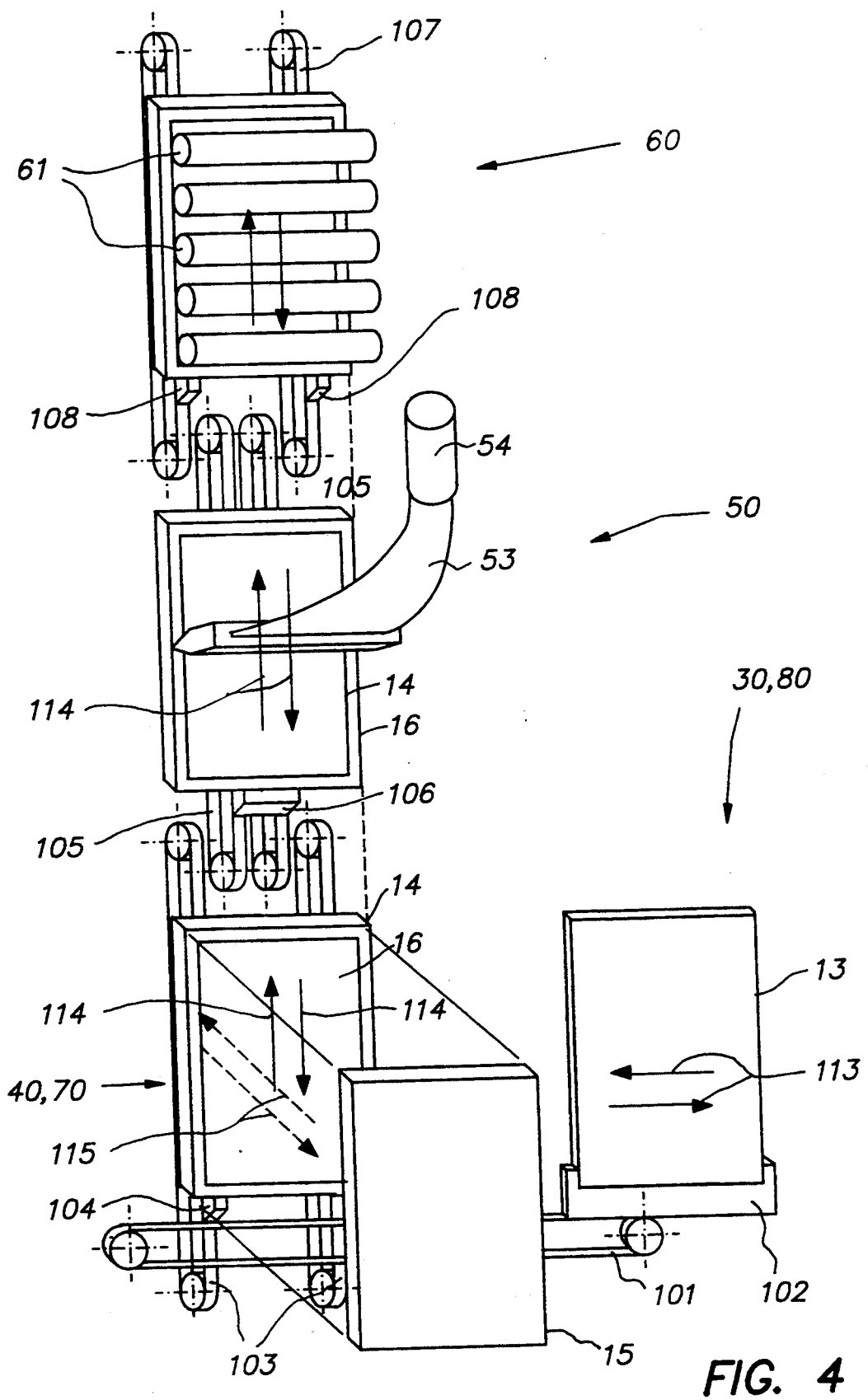
FIG. 4 is a schematic diagram illustrating a second embodiment of apparatus in accordance with this invention.

FIG. 4 illustrates a simpler embodiment of the apparatus shown in FIG. 3, and the same reference numerals are used to indicate analogous integers. The embodiment of FIG. 4 is designed for processing one cassette at a time. The exposed cassette 13 is loaded at input station 30 onto a bracket 102 carried by conveyor 101 which transports the cassette to a separating station 40, where the cap 15 is separated from the base plate 14 bearing the PSL layer 16 and is held pending processing of the PSL material 16. The base plate 14 is transported upwardly by conveyors 103 supported by brackets 104, and then through the scanning station 50 by scanning conveyors 105 and associated brackets 106. The base plate is then taken up by conveyors 107 on which it is supported by brackets 108 while erasure takes place in the erasing station 60. After erasure, the base plate 14 is then transported downwardly by the same conveyors, back to the separating station 40 which is now the assembly station 70. The base plate 14 and cap 15 are there re-united, and transported back by conveyor 101 to the input station which is now the output station 80.

Figure 5A:
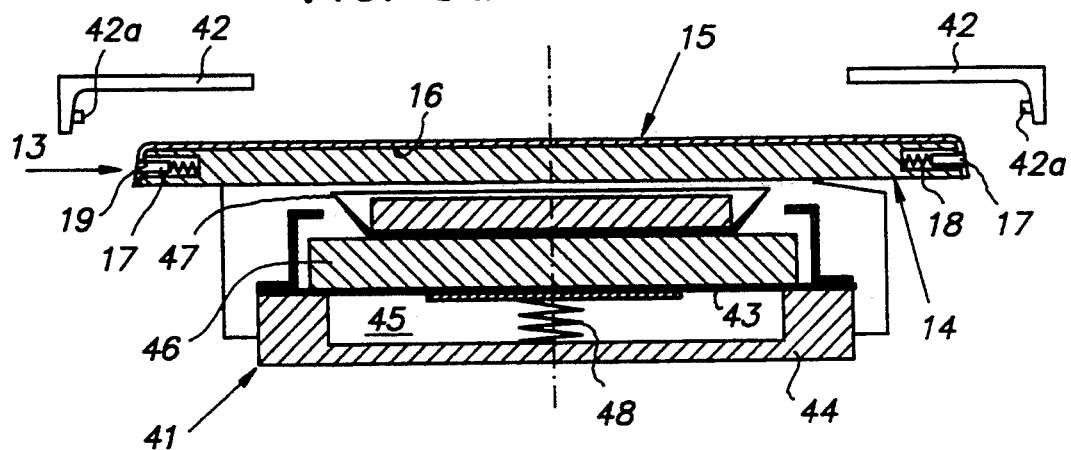
FIGS. 5a, 5b and 5c are views illustrating a separating station of the apparatus of FIGS. 2 to 4.
Figure 5B:
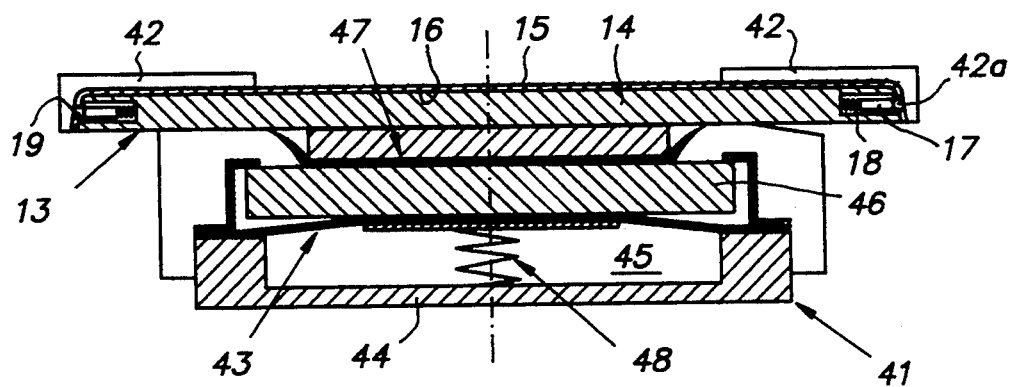
Figure 5C:
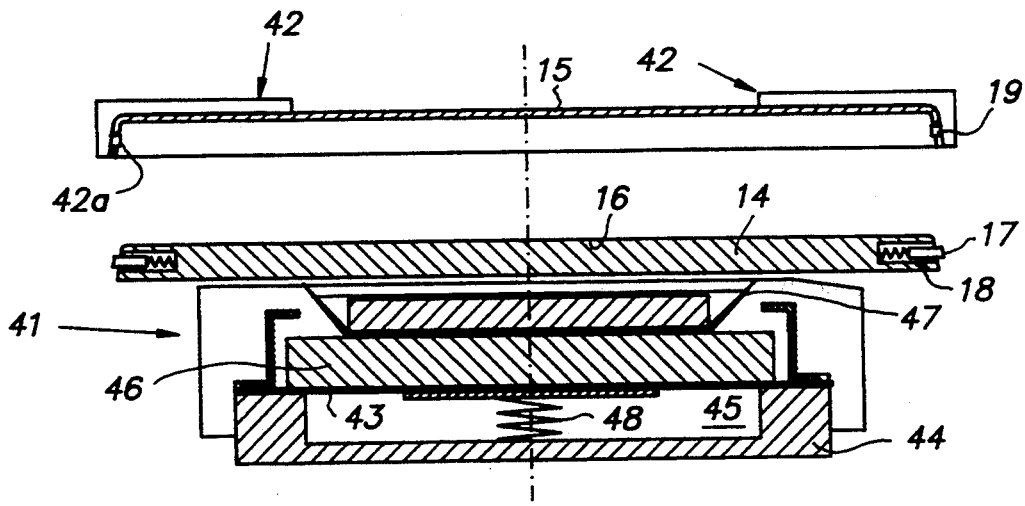

Referring now to FIGS. 5a, 5b and 5c, the cassette 13 consists of a base plate 14 and a cap 15. The base plate has a coating 16 of PSL material on its upper surface, and the edges of the base plate have a slight bevel to which the sides of the cap 15 conform. This provides for a degree of self-centring during re-assembly of the cassette. Latching mechanisms are located at suitable points around the edges of the base plate and cap. Different sizes of cassette are more easily accommodated if these latching points are located at same distances from the ends of a pair of opposite side of the cassettes. Each latching mechanism comprises a captive pin 17 in the base plate which pin is loaded by a spring 18 to engage a hole 19 in the cap. The bevel of the edges of the base plate and cap is such that on re-assembly the pin 17 is pushed in by the edges of the cap to snap out into engagement with its associated hole 19.

In the separating station 40, the scanning apparatus includes means 41 for holding the base plate 14 and means 42 for stripping away the cap. In the embodiment shown, the cap stripping means comprises gripper arms 42 provided with studs 42a each of which is movable to penetrate a hole 19 in the cap 15 thus driving the spring loaded pin 17 out of that hole, so that the cap is both securely held by the gripper arms and disengaged from the means securing it to the base plate 14.

The means 41 for holding the base plate 14 comprises a membrane 43 attached to a frame 44 to define a chamber 45. The membrane 43 is attached to a plate 46 which carries a suction cup 47, and is biased with respect to the frame by a spring 48. In the arrangement shown, see especially FIG. 3b, when the gripper arms 42 have been locked onto the cap 15, positive pressure is applied to the interior of the chamber 45 to overcome the bias of the spring 48 and the suction cup 47 is pressed against the bottom surface of the base plate 14 to hold the latter as the cap 15 is stripped away. In a variant, negative pressure may be applied to the interior of the chamber 45 to hold the membrane in the position shown in FIGS. 3a and 3b against the pressure of the spring 48, and relaxed so that the suction cup 47 is pressed against the base plate 14 by the spring 48.

The base plate holder 41 is mounted between the lowermost upwardly running conveyors 103 shown in FIGS. 3 and 4.

We claim:

1. Scanning apparatus for scanning a cassette of the type used in photo-stimulable luminescence (PSL) radiography, which cassette comprises a flat substantially rigid base plate carrying on one side thereof a layer of PSL material and a cover for said one side adapted to be releasably secured to said base plate in overlying relation to said one side so as to light-tightly cover said layer of PSL material wherein said apparatus comprises a receiving station for the receipt of said cassette into the apparatus with the flat plate thereof extending in a generally vertical orientation, transport means for conveying the cassette while remaining in said substantially vertical orientation to a separating station which includes means for separating said base plate and its cover from each other while the base plate remains in said orientation, means for transporting said base plate in said generally vertical orientation along a path leading through a scanning station where the plate is scanned, to an erasing station, and to an assembly station where the plate and its cover are re-assembled, the apparatus being arranged in such a way that the cover and the base plate remain in substantially parallel relationship during their separation and re-assembly.

2. The scanning apparatus of claim 1, wherein said receiving station comprises an input shelf for holding a plurality of said cassettes in a generally vertically oriented input stack and means for successively taking one cassette at a time from such stack into the apparatus, and said apparatus further comprises an output shelf for holding a plurality of re-assembled cassettes in a generally vertically oriented stack for removal from the apparatus.

3. The scanning apparatus of claim 1, wherein said apparatus further comprises means for transporting each cover after removal from a base plate directly to said assembly station.

4. The scanning apparatus of claim 1, wherein said separating station and said assembly station are one and the same.

5. The scanning apparatus of claim 1, wherein said transport means is arranged to transport said base plate substantially in its own plane along said path from said separating station to said assembly station.

* * * * *